Feb. 10, 1970    M. E. SHELL    3,494,490
METHOD FOR APPARATUS FOR HANDLING STACKED MATERIALS
Filed Sept. 26, 1967    3 Sheets-Sheet 1

INVENTOR
Melvin E. Shell
BY
ATTORNEYS

Feb. 10, 1970    M. E. SHELL    3,494,490
METHOD FOR APPARATUS FOR HANDLING STACKED MATERIALS
Filed Sept. 26, 1967    3 Sheets-Sheet 2

INVENTOR
Melvin E. Shell
BY
ATTORNEYS

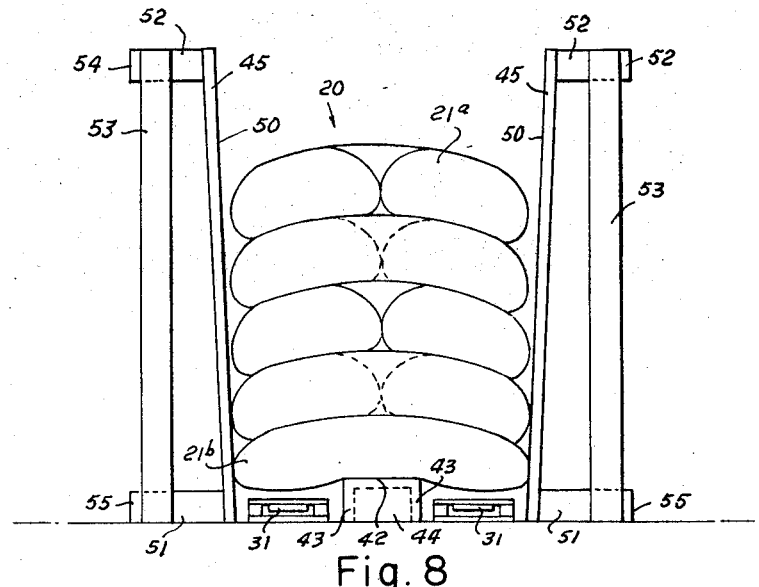
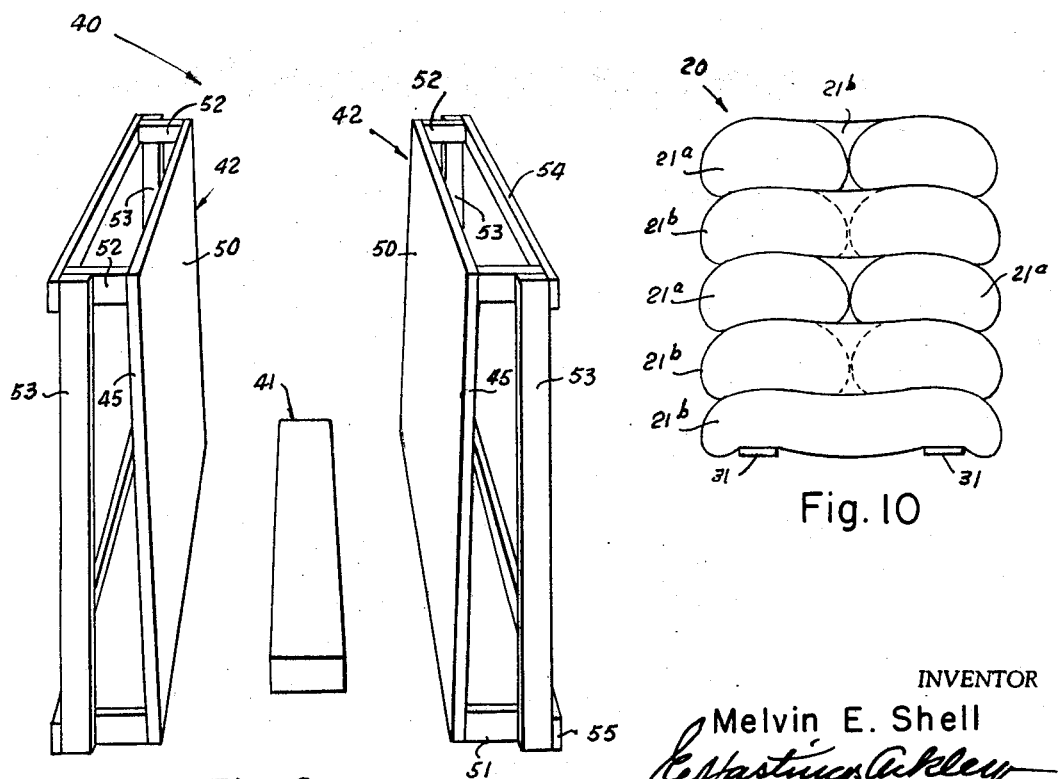

United States Patent Office 3,494,490
Patented Feb. 10, 1970

3,494,490
METHOD AND APPARATUS FOR HANDLING STACKED MATERIALS
Melvin E. Shell, P.O. Box 698, Gorman, Tex. 76454
Filed Sept. 26, 1967, Ser. No. 670,634
Int. Cl. B65b *69/00;* B65g *65/00*
U.S. Cl. 214—310        7 Claims

ABSTRACT OF THE DISCLOSURE

A method and apparatus for loading and handling stacked materials including loading the materials on forklift truck supportable sleeves, inserting the fork prongs into the sleeves, moving the load and depositing it at a storage area leaving the sleeves in place below the materials on the floor, moving the load from storage to a special unloading rack for removal of the sleeves, and moving the load into freight cars, trucks, and the like. Where the materials are stored in layered relationship with the several loads supported one on the other, stability of the loads is enhanced by stabilizing means or frame between layers.

---

This invention relates to material handling and more particularly relates to a method and apparatus for handling stacked materials.

It is an object of this invention to provide a method and apparatus for material handling, and particularly to provide a method and apparatus for handling stacked material.

It is another object of this invention to provide a method of handling stacked materials involving a minimum of manual handling of individual units of the materials.

It is still another object of the invention to provide a method of handling stacked material which utilizes a minimum of stack supporting and stabilizing apparatus and eliminates the need for conventional pallets.

It is still a further object of the invention to provide a method of handling stacked materials where the materials are loaded out in freight cars or trucks for shipment alone without supporting and aligning apparatus such as pallets.

It is still a further object of the invention to provide a method of handling stacked materials with forklift trucks utilizing supporting and handling sleeves which receive the prongs or tines of the truck fork.

It is a further object of the invention to provide a method of handling stacked material including positioning stabilizing and supporting strips between layers of the stacks of materials.

It is another object of the invention to provide a method of handling stacked materials including a first phase wherein the materials are stacked on sleeve units, the sleeve units are supported on the prongs of a forklift truck, the load of materials is moved to a first area for storage where the load is placed on a supporting surface leaving the sleeves in place below the load, and a second phase in which the forklift truck prongs or forks are reinserted into the sleeves and the load is moved to an unloading rack at a second area, supported on a support unit of a rack which stabilizes the load laterally while the sleeves are removed from beneath the load and from the prongs, the load is relifted on the prongs or forks alone, and the load is moved to and deposited at a third area such as a freight car or truck for shipping.

It is another object of the invention to provide a method of handling stacked materials where a plurality of groups of stacks are positioned in several layers between each group of which stabilizing means such as a frame assembly is interposed to provide lateral stabilizing of the group of stacks, the stabilizing means resting on a layer below while supporting a layer above.

It is still a further object of the invention to provide apparatus for handling stacked material including sleeve units each adapted to receive a prong of a forklift truck and having a load supporting surface for supporting materials on the sleeve unit while the sleeve unit is supported on a forklift truck, an unloading rack having means for temporarily supporting a load of stacked material both vertically and laterally while removing the supporting sleeves on the forklift truck prongs and permitting the relifting of the load with the prongs alone, and a stabilizing frame for stabilizing a plurality of layers of stacked materials.

Additional objects and advantages of the invention will be readily apparent from the reading of the following description of a device constructed in accordance with the invention, and reference to the accompanying drawings thereof, wherein:

FIGURE 8 is an end view in elevation of a bag stack within an unloading rack used for removal of the sleeves from beneath the stack of bags;

FIGURE 9 is a perspective view of the unloading rack of FIGURE 8 with the stack of bags removed; and, FIGURE 10 is an end view in elevation of the stack of bags supported on forklift truck prongs alone.

Figures 3, 4:
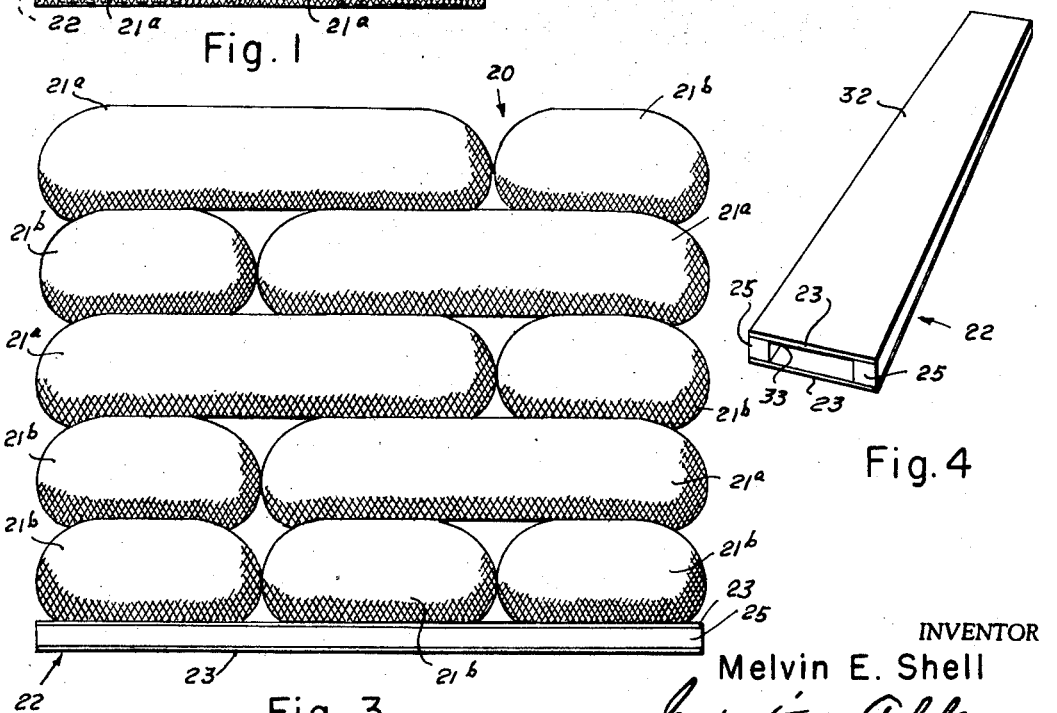
FIGURE 3 is a side view in elevation of the stack of bags on the sleeve unit illustrated in FIGURES 1 and 2.
FIGURE 4 is a perspective view of one of the sleeve units used to support the stack of bags shown in FIGURES 1-3.

Referring to the drawings a stack 20 of bags of material which is handled in accordance with the invention comprises a plurality of layers of longitudinally positioned bags 21a and laterally positioned bags 21b. The stack is supported during both storage and handling by a forklift truck, not shown, on a pair of spaced, generally parallel, sleeves 22. The bottom layer of the bags, which rests directly on the sleeves, comprises all laterally or transversely positioned bags 21b since a longitudinally positioned bag would likely fall between the sleeves, depending of course upon the dimensions of the bag relative to the spacing between the supporting sleeves. Generally, however, it is preferred that the first layer of the bags which must support the remaining layers be aligned transversely or laterally across the sleeves. The other layers of the stack are made up of both laterally and longitudinally positioned bags to enhance the stability of the stack with the lateral and longitudinal positions being alternated in the several upper layers of the stack. Each upper layer has two longitudinally positioned bags at one end of which is a single laterally extending bag. As best shown in FIGURE 3, the bag positioning in the several layers is alternated so that there is overlapping of the longitudinal and lateral bags in adjacent layers so that each pair of longitudinal bags rests partly on a lateral bag and partly on a pair of longitudinal bags. Similarly, each lateral bag extends across the pair of longitudinal bags immediately below it. The alternate positioning of the bags enhances the stability of the stack minimizing a tendency of the stack to lean toward either of its sides or ends.

Each of the sleeves 22 preferably has spaced, parallel upper and lower identical panels 23, connected with each other by spaced parallel side strips 25 defining through the length of the sleeve an open-ended slot or recess 30 sized to receive a prong 31, FIGURE 8, of the fork of a forklift truck, not shown. Each sleeve is approximately the length of the width of three bags or of the length of a forklift truck prong and open at its opposite ends so that the prong is insertable into the slot 30 from either end of the sleeve. Each sleeve is reversible and has outside surfaces 32 over each of its panels 23. One surface 32 serves as a load bearing surface for supporting the bags while the opposite surface 32 supports the sleeve on a surface such as the floor of a storage area, freight car, and the like. The inside surface 33 of each panel 23 is engageable with a prong 31 for supporting the sleeve on the prong.

An unloading rack 40 used in the second or "loading out" phase of the handling method is illustrated in FIGURE 9. The rack includes a central stack or load supporting unit 41 positioned generally parallel to and spaced about evenly between a pair of identical side support panel assemblies 42. The unit 41 may be either a solid member, may comprise a stack of strips of wood, metal, or the like, or, as shown in FIGURE 8 may be a hollow channel member having a top 42, sides 43, and end panels 44. The height of the supporting unit 41 is sufficient to permit unobstructed movement of the sleeves 22 from beneath the stack of bags 20 while the stack is temporarily supported on the unit. The side panel assemblies 42 which laterally stabilize the stack each includes a solid or substantially solid support panel member 45 having a face 50 engaged by the edges of the bags comprising the stack 20 when the stack is positioned between the panel assemblies, FIGURE 8. The panel 45 is mounted on lower lateral spaced members 51 and upper lateral spaced members 52 which are shorter than the lower lateral members so that the panel member 45 is supported at an angle with the vertical such that when the pair of panel assemblies are positioned facing each other as shown in FIGURE 9, the faces 50 converge downwardly so that the lower portions of faces 50 are closer together than the upper portions of the faces to facilitate insertion and removal of the stack 20 between the panel assemblies. The lower and upper members 51 and 52 at each end of the panel 45 are connected by vertical supports 53. As shown, upper and lower horizontal braces 54 and 55, respectively, may be provided to extend between the upper lateral members 52 and the vertical braces 53 and the lower lateral members 51 and the braces 53, respectively. The unit 41 and the side panel assemblies 42 cooperate to provide a unitary function of vertically supporting and laterally stabilizing a stack 20 during the removal of the sleeves 22, as discussed below. The unit 41 and panel assemblies 42 are not physically connected to allow adjustment of their relative positions to accommodate various size stacks in the rack, if desired.

Figure 5:
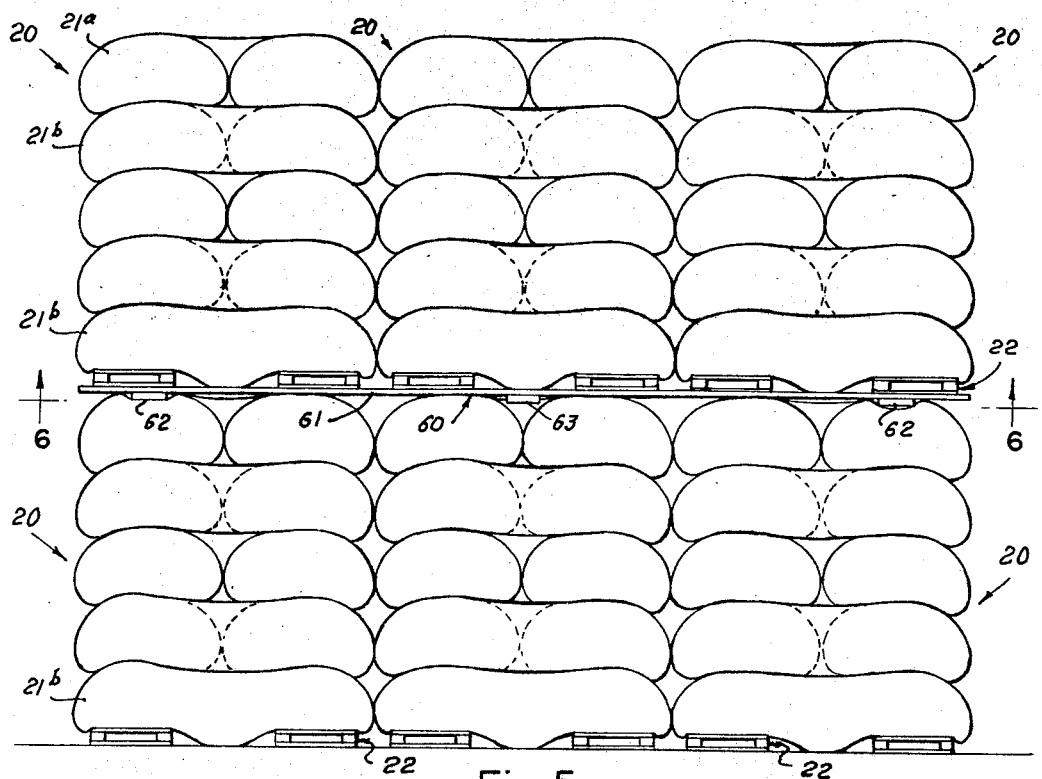
FIGURE 5 is an end view in elevation of a multi-layered arrangement of a plurality of groups of stacks of bags including a stabilizing frame between the groups of bag stacks.
Figure 6:
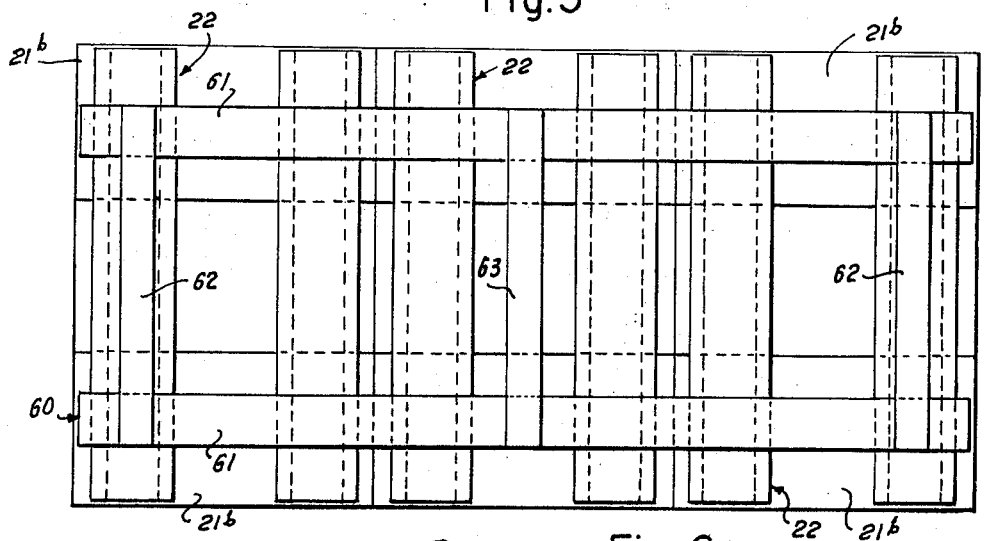
FIGURE 6 is a view in section along line 6—6 of FIGURE 5 showing in a bottom view of one of the stabilizing frames used between layers of the bag stacks.
Figure 7:
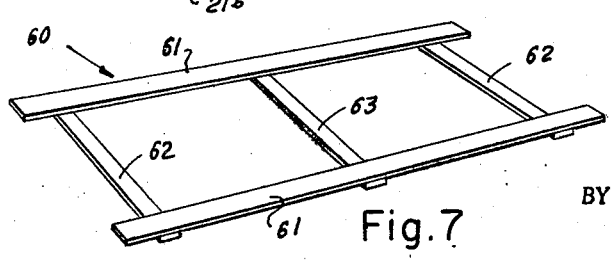
FIGURE 7 is a reduced perspective view of the stabilizing frame.

FIGURES 6 and 7 illustrate a stabilizing and support frame 60 used in a stack arrangement as illustrated in FIGURES 5 and 6, where several groups or layers of stacks 20 are stored in stacked relationship. The rectangular support frame comprises a pair of parallel spaced longitudinal members 61 connected together by end and intermediate cross members 62 and 63, respectively, secured at spaced points along the bottom faces of the members 61 so that the end members 62 rest on outside top bags in the end stacks 20 of the group or layer below the frame. The frame width as measured along the members 62 and 63 is substantially equal to the length of the stack 20 as seen in FIGURE 3. The length of the frame as measured along the members 61 is substantially equal to the sum of the width of the stacks 20 making up each layer of the multiple stack group shown in FIGURE 5. The thickness of the cross members 62 and 63 is sufficient for the prongs 31 of a forklift truck to be inserted between the top surfaces of bags supporting the frame and beneath the bottom faces of the longitudinal members 61 for lifting the frame upwardly from the layer of stacks below it. The cross members 62 are each spaced inwardly from the ends of the longitudinal members 61 to position each cross member near the center line of the bag immediately below it so that the members 61 of the frame are supported slightly above the bags in the stacks providing the small clearance necessary for the insertion of the forklift prongs 31 under the frame when it is resting on a layer of stacks.

Figure 1:
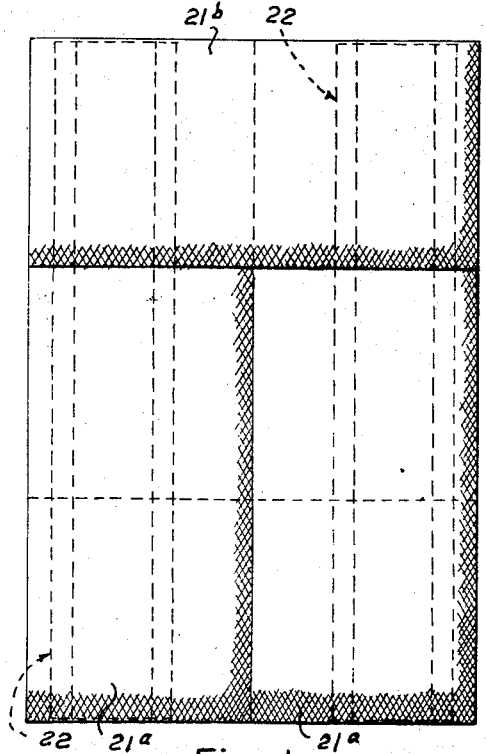
FIGURE 1 is a top view of a stack of bags supported on sleeve units in accordance with the invention.
Figure 2:
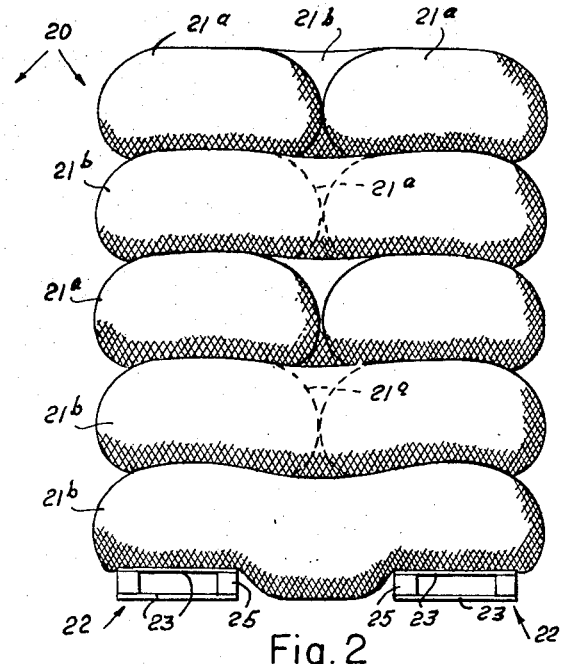
FIGURE 2 is an end view in elevation of the stack of bags on the sleeve units as shown in FIGURE 1.

The first phase of the method of handling stacked material in accordance with the invention is the movement of the material to a storage area, such as in a warehouse, from production lines or incoming trucks, freight cars, and the like. A pair of the sleeves 22 are placed parallel in aligned spaced relation on a supporting surface such as a floor, spaced to be disposed to receive the prongs of the forklift truck. The bags 21a and 21b are stacked on the sleeves, preferably in the relationship already described, and illustrated in FIGURES 2 and 3, to provide a stack 20 on the sleeves having maximum stability. The width, height and length of the stack is determined by the size of the bags being handled, by the dimensions of the fork of the forklift truck, and the sleeves and insofar as the height is concerned, the number of layers of bags is controlled both by the height to which the stack can be built while remaining substantially stable, and where stacks are to be placed one on the other, the height to which the fork of the forklift truck is raisable to remove the upper stacks. For example, referring to FIGURE 5, the height of the stacks making up the lower layer should be no greater than the height to which the folk of the forklift truck is readily raisable so that the stacks comprising the upper layer may easily be loaded and removed. Alternatively, the sleeves may be placed on the prongs of the forklift truck first and the bags then stacked on the sleeves as discussed above until the stack is the desired height.

After the stack 20 is completed as described above and suported by the forklift truck, the truck is driven to the desired storage area where the stack is deposited on a supporting surface, which may be the floor of the storage area. The prongs of the fork are then withdrawn from the sleeves leaving the stack supported on the sleeves which are resting on the floor.

If several stacks are moved to the storage area they are placed side by side in the storage area with the number of stacks positioned immediately adjacent each other being determined by such factors as accessibility for removal. Where there are sufficient number of stacks of material and the height of the storage area permits, the stacks are arranged in two or more layers as illustrated in FIGURE 5. Each grouping of stacks preferably is at least three stacks wide to provide maximum lateral stability. After the first three stacks forming the bottom layer are positioned on the floor of the storage area as shown in FIGURE 5, the stabilizing frame 60 is placed on the top of the stacks generally aligned on the stacks with the end cross members 62 of the frame being centered along the outer top bags 21a of the end stacks. After the stabilizing frame is positioned on the first layer or group of stacks, additional stacks are placed with the forklift truck in side-by-side relationship on the top of the stabilizing frame, providing a second layer of stacks as shown in FIGURE 5. Each stack is lowered with the forklift truck until the bottom surfaces 32 of the bottom panels 23 of the sleeves 22 supporting the stack are resting on the top surfaces of the longitudinal members 61 of the stabilizing frame. The forks are then withdrawn from the sleeves leaving the stack supported on the sleeves of the stabilizing frame. More than two layers or groups of stacks in side-by-side relationship may be stacked on each other with a stabilizing frame 60 being disposed between adjacent layers. The arrangement of at least three stacks in side-by-side relationship in each layer enhances the stability of the stack grouping in that if one of an outside stack at one end tries to fall away from the other stacks, the center and opposite end stacks acting through the stabilizing frame tend to hold the stack in place. For example, in FIGURE 5, if one of the right end stacks tends to fall toward the right it will apply a pulling force toward the right on the stabilizing frame which transmits the force to the center and left end stacks which resist the inclination toward falling of the right end stack.

The second or "loading out" phase of the method involves the movement of the stored stacked materials from the storage area to a further area, which may be a truck or a freight car for shipping the materials. A forklift truck is moved to the storage area and the prongs of its fork are inserted into the sleeves 22 below one of the outside stacks in the top layer of stacks. The stack is lifted with the fork and moved to the unloading rack 40 for temporary support during removal of the sleeves 22. The stack 20 supported on the sleeves 22 is lowered between the panels 45 until the bags 21b in the bottom layer of sacks in the stack are resting on the support unit 41 as shown in FIGURE 8. At this position the stack is supported between the stabilizing panels and the bags 21b extend perpendicular to the support unit 41. The convergent relationship of the panel surfaces 50 of the two stabilizing panel assemblies allows the stack to be easily lowered between the panel without binding, and, if the panel assemblies have been previously properly positioned, without the need for moving the assemblies. The fork of the truck is lowered until the stack is fully supported vertically on the unit 41 with the panels 45 stabilizing the stack laterally to prevent its falling to either side. The fork is withdrawn from beneath the stack carrying the sleeves with it, and the sleeves are then removed from the fork prongs. The fork is then reinserted between the panels 45 under the bottom layer bags in the stack on opposite sides of the unit 41 and lifted, re-engaging the stack and supporting it on the fork prongs alone, as shown in FIGURE 10. The forklift truck carrying the stack is then moved to the truck or freight car, and to the desired position within the transporting vehicle, and the fork is lowered to the floor of the vehicle so that the bags in the lower bottom layer of the stack supported on the fork prongs as in FIGURE 10 are substantially resting on the floor of the vehicle. The fork prongs are then withdrawn from beneath the stack leaving the stack in position in the vehicle. The stacks are placed in side-by-side relationship in the vehicle being loaded, and if a second layer of stacks is desired they are placed on the first layer of stacks with the fork being withdrawn after each stack is brought to a position of rest on the stack immediately below it.

The stacks of material are moved from the storage area to the unloading rack and from the rack to the transport vehicle without individual manual handling of the bags. The shape and available space in a particular transport vehicle may occasionally necessitate the manual handling of a few of the bags, particularly around the door of the vehicle. However, other than under such circumstances, the entire operation of loading out the sacks from a storage area to a transport vehicle is effected without manual handling of the bags. The stacks of bags are stored in the transport vehicle without supporting pallets or any other supporting or stabilizing structure between the layers of sacks thereby effectively increasing the storage capacity of the transport vehicle, and eliminating the cost of extra pallets for shipment with the material and the problems inherent in return of the pallets, in addition to the extra labor involved in handling them.

It will be evident that several modifications may be made in the apparatus employed while retaining the functional characteristics of the apparatus for carrying out the method. For example, the bottom panel 23 of the sleeves 22 may be eliminated leaving an open-bottom-channel-shaped sleeve. The sleeves 22 may be of single piece construction provided by casting or otherwise forming the sleeve in one piece. Also, the functional features of the stabilizing frame 60 may be provided by a less preferred structure comprising only the longitudinal strips 61 positioned along on the top layer or group of the bags of a layer of stacks to support the sleeves 22 of the next layer of stacks. It will also be evident that other forms of supporting members may be used to hold the panel 45 of the unloading frame 40 in place. Also, the support unit 41 may be connected by any suitable means between the panel assemblies 42 which are then held at fixed space relation with each other and with the support unit 41 where large quantities of stacks of uniform size are being handled. In cases where a forklift truck having a fork with more than two prongs is used, the number of sleeves 22 may conform to the number of prongs on the fork.

It will now be seen that a new and improved method and apparatus for material handling particularly for handling stacked material, has been described and illustrated.

It will also be seen that the method of handling stacked material in accordance with the invention involves a minimum of manual handling of individual units forming the material.

It will also be seen that the method of handling stacked material employs a minimum of stack supporting and stabilizing apparatus and eliminates the need for a conventional form of cargo pallet.

It will be further seen that the materials are loaded out for shipment without stack supporting or stabilizing apparatus thereby reducing the cost of the extra apparatus normally required for such purposes and without the added expense of returning such apparatus to the shipper.

It will also be seen that the apparatus used in the method includes removable load supporting sleeves for the prongs of a forklift truck, an unloading rack including a support unit and lateral stabilizing panel assemblies, and a stabilizing frame for lateral stabilizing of multilayered arrangements of the stacked materials.

It will be further seen that a first phase of the method includes manually stacking the material on load supporting sleeves, supporting the sleeves on the prongs of a forklift truck, moving the stack of materials to and depositing it at a storage area positioning a stabilizing frame between layers of the stacks where a multi-layer arrangement is used, and a second phase of removing the materials from the storage area to a further area which may be a transport vehicle, including re-inserting the prongs of a forklift truck into the sleeves below each stack of materials, moving the stack to an unloading rack where it is temporarily supported, removing the sleeves from beneath the stack, resupporting the stack on the forklift prongs alone, moving the stack to the transport vehicle, positioning the stack on a supporting surface within the vehicle, and withdrawing the prongs of the forklift truck from beneath the stack.

The foregoing description of the invention is explanatory only, and changes in the details of the construction illustrated may be made by those skilled in the art, within the scope of the appended claims, without departing from the spirit of the invention.

What is claimed and desired to be secured by Letters Patent is:

1. A method of handling material comprising: positioning a stack of a plurality of separate units of said material each having a length and width less than the length and width of the stack on a pair of laterally spaced parallel elongate load supporting sleeve means; engaging and supporting said sleeve means on prong means of a forklift truck; moving said stack supported on said sleeve means to a desired loading-out location; positioning said sleeve means on opposite lateral sides of an elongate single load support member having an upper supporting surface higher than the height of said pair of supporting sleeve means with said stack of units supported on said supporting surface of said elongated support member at said desired loading-out location; withdrawing said supporting sleeve means from beneath said stack on said prong means leaving said stack supported on said supporting surface of said elongated support member at said loading-out location; and laterally stabilizing said stack of units by abutment panel assemblies spaced on opposite sides of said elongated central support member for supporting side portions of said load against lateral movement while said load is supported vertically on said support member.

2. A method as defined in claim 1 wherein said stack is positioned on said sleeve means before said sleeve means is engaged on said prong means.

3. A method as defined in claim 1 wherein said sleeve means is supported on said prong means before said stack is positioned on said sleeve means.

4. A method of handling material units comprising: stacking a plurality of said units in a stack having a length and width greater than the width of said units on a pair of laterally spaced parallel supporting sleeves each adapted to receive the prong of a forklift truck; inserting the forks of a forklift truck into said sleeve; supporting said stack of units on said sleeves on said prongs; moving said sleeves and stack with said forklift truck on a first area; at said first area depositing said sleeves and stack on a supporting surface, said sleeves remaining in supporting relationship on said supporting surface beneath said stack, withdrawing said prongs from said sleeves; thereafter re-inserting prongs of a forklift truck into said sleeves; removing said sleeves with said stack by means of said truck to a second area; positioning said supporting sleeves on opposite lateral sides of an elongate support member having an upper support surface higher than the height of said sleeves for supporting said stack above said sleeves; laterally stabilizing said stack along opposite sides parallel to the elongate opposite sides of said support member to prevent said stack of units from falling laterally off said supporting surface of said support member; removing said sleeves from below said stack of units; removing said sleeves from said prongs of said forklift truck; re-inserting said prongs below said stack of units on opposite sides of said elongate support member; lifting and supporting said stack on said prongs while removing said stack from between said lateral supports and off said support member; moving said stack by means of said forklift truck to a third area; depositing said stack on a load supporting surface at said third area; and withdrawing said prongs of said forklift truck from below said stack leaving said stack on said supporting surface at said third area.

5. A method as defined in claim 4 wherein said stack comprises a plurality of sacks of particulate material arranged in predetermined stacked relationship.

6. A method as defined in claim 4 wherein said stack is laterally stabilized between a pair of abutment panel assemblies disposed in downwardly convergent relationship with respect to each other on opposite sides of said support member and spaced apart from each other at their lower ends substantially the width of said stack and engaging a portion of an adjacent side stack for providing such lateral stability to said stack while said stack is supported on said support member.

7. Apparatus for handling stacked material with a forklift truck having a fork member with parallel spaced prong means comprising: a pair of sleeves each in the form of a channel member having a slot therethrough for receiving said prong means for supporting said sleeves on said prong means, said sleeves having load supporting surfaces for supporting said stacked material thereon; a single, central elongate load supporting surface which is higher than the height of said sleeves and having a width which is less than the distance between the prong means for temporarily supporting said load while removing said sleeves from beneath said load and from said prong means and for permitting said prong means to be repositioned below and in supporting relationship with said stacked material, lateral stabilizing panel assemblies spaced from and along opposite sides of said elongate supporting surface, and on the outside of the prong means, each of said panel assemblies having an upwardly and outwardly inclined panel surface for engaging an adjacent side surface of a stack of material on said elongate surface for holding said stack against lateral movement off said elongate support surface; stabilizing frame means for positioning between vertically spaced horizontal layers of a plurality of laterally adjacent stacks of said material to support said layers of stacks against lateral movement with respect to the stacks therebelow, and comprising a substantially rectangular assembly having spaced longitudinal strip members having upper surfaces for supporting said supporting sleeves under a layer of material stacks above said frame and cross members having lower surfaces adapted to rest on said stacks below said frame and near the edges of said layer of stacks.

References Cited

UNITED STATES PATENTS

| | | | |
|---|---|---|---|
| 2,341,088 | 2/1944 | Ellis. | |
| 2,394,692 | 2/1946 | Isler | 214—152 |
| 2,498,804 | 2/1950 | Goff | 214—10.5 X |
| 2,639,050 | 5/1953 | Hoffman | 214—310 |
| 2,803,363 | 8/1957 | Hutchinson | 214—621 |
| 2,924,340 | 2/1960 | Barto | 108—53 |
| 3,151,754 | 10/1964 | Kemp | 214—310 |
| 3,209,705 | 10/1965 | Crane | 214—10.5 X |
| 3,223,259 | 12/1965 | Nicholson | 214—621 X |
| 3,369,676 | 2/1968 | Swetnam | 214—10.5 |
| 3,381,828 | 5/1968 | Sheehan | 214—6 |

FOREIGN PATENTS

| | | |
|---|---|---|
| 680,622 | 2/1964 | Canada. |
| 903,328 | 8/1962 | Great Britain. |
| 369,400 | 6/1963 | Switzerland. |

ROBERT G. SHERIDAN, Primary Examiner

ROBERT J. SPAR, Assistant Examiner

U.S. Cl. X.R.

108—55; 214—10.5, 38, 152